US012781904B2

(12) United States Patent
Barnes

(10) Patent No.: US 12,781,904 B2
(45) Date of Patent: Nov. 3, 2026

(54) METHODS OF JOINING OR REPAIRING LINED PIPES AND ASSOCIATED APPARATUS

(71) Applicant: Pioneer Lining Technology Limited, Glasgow (GB)

(72) Inventor: Stephen Barnes, Milngavie (GB)

(73) Assignee: PIONEER LINING TECHNOLOGY LIMITED, Glasgow (GB)

( * ) Notice: Subject to any disclaimer, the term of this patent is extended or adjusted under 35 U.S.C. 154(b) by 0 days.

(21) Appl. No.: 18/222,474

(22) Filed: Jul. 16, 2023

(65) Prior Publication Data

US 2024/0019066 A1 Jan. 18, 2024

Related U.S. Application Data

(62) Division of application No. 16/339,713, filed as application No. PCT/GB2017/053007 on Oct. 5, 2017, now Pat. No. 11,739,876.

(30) Foreign Application Priority Data

Oct. 5, 2016 (GB) ..................................... 1616902

(51) Int. Cl.
*F16L 47/03* (2006.01)
*B29C 65/00* (2006.01)
(Continued)

(52) U.S. Cl.
CPC .............. *F16L 47/03* (2013.01); *B29C 65/04* (2013.01); *B29C 65/3632* (2013.01);
(Continued)

(58) Field of Classification Search
CPC ...... F16L 47/03; B29C 65/04; B29C 65/3668; B29C 65/36; B29C 66/52272
See application file for complete search history.

(56) References Cited

U.S. PATENT DOCUMENTS 4,090,899 A * 5/1978 Reich .................... B29C 66/112 285/21.2
5,009,737 A 4/1991 Lescaut
(Continued)

FOREIGN PATENT DOCUMENTS

CN 101852323 A 10/2010
DE 102 01 501 C1 8/2003
(Continued)

OTHER PUBLICATIONS

Machine Translation RU2079033C1 (Year: 1997).*
Australian Office Action received in corresponding Australian Application No. 2022287544 dated May 10, 2024.

*Primary Examiner* — Daniel Mcnally
(74) *Attorney, Agent, or Firm* — MATTINGLY & MALUR, PC

(57) ABSTRACT

A method creates a weld between a liner of a section of lined pipe and an electrofusion fitting. The fitting has at least one heating element, which is suitably disposed on or in an outer surface of the electrofusion fitting and is electrically isolated from an inner surface of the fitting. The method includes locating an end of the electrofusion fitting within an end of the section of lined pipe, locating an induction coil within a bore of the electrofusion fitting in the vicinity of the at least one heating element, and supplying electrical power to the induction coil to energise the at least one heating element by electromagnetic induction.

27 Claims, 2 Drawing Sheets

(51) Int. Cl.

| | |
|---|---|
| ***B29C 65/04*** | (2006.01) |
| ***B29C 65/36*** | (2006.01) |
| ***F16L 55/165*** | (2006.01) |
| ***F16L 55/18*** | (2006.01) |
| ***H05B 6/10*** | (2006.01) |
| *B29L 23/00* | (2006.01) |

(52) U.S. Cl.
CPC ........ *B29C 65/364* (2013.01); *B29C 65/3668* (2013.01); *B29C 65/3676* (2013.01); *B29C 66/1224* (2013.01); *B29C 66/5221* (2013.01); *B29C 66/52272* (2013.01); *B29C 66/612* (2013.01); *B29C 66/636* (2013.01); *B29C 66/72321* (2013.01); *B29C 66/73921* (2013.01); *F16L 55/1656* (2013.01); *F16L 55/18* (2013.01); *H05B 6/105* (2013.01); *B29L 2023/22* (2013.01)

(56) References Cited

U.S. PATENT DOCUMENTS

| | | | | |
|---|---|---|---|---|
| 6,193,834 | B1 | 2/2001 | Smith | |
| 2004/0083957 | A1 * | 5/2004 | Latvis | B05B 13/0436 118/620 |
| 2011/0193339 | A1 | 8/2011 | Kenworthy | |
| 2013/0114945 | A1 * | 5/2013 | Pionetti | B29C 66/1224 392/472 |

FOREIGN PATENT DOCUMENTS

| | | | | | |
|---|---|---|---|---|---|
| EP | 1 520 684 | A1 | | 4/2005 | |
| EP | 1626220 | A1 | | 2/2006 | |
| GB | 2 284 179 | A | | 5/1995 | |
| GB | 2500285 | A | * | 9/2013 | G01M 3/02 |
| GB | 2527187 | A | | 12/2015 | |
| GB | 257841 | A | | 1/2016 | |
| JP | 05187588 | A | * | 7/1993 | B29C 65/344 |
| JP | 6-281057 | A | | 10/1994 | |
| RU | 2079033 | C1 | * | 5/1997 | |
| SU | 1680557 | A1 | | 9/1991 | |
| WO | 91/09247 | A1 | | 6/1991 | |
| WO | WO-9749540 | A1 | * | 12/1997 | B29C 66/7392 |
| WO | 98/37353 | A1 | | 8/1998 | |
| WO | 2008/154040 | A1 | | 12/2008 | |
| WO | 2009/007537 | A1 | | 1/2009 | |
| WO | 2010/041016 | A1 | | 4/2010 | |
| WO | 2013/136062 | A1 | | 9/2013 | |
| WO | 2015/008028 | A1 | | 1/2015 | |

* cited by examiner

METHODS OF JOINING OR REPAIRING LINED PIPES AND ASSOCIATED APPARATUS

The present invention relates to the field of electrofusion fittings such as employed to join sections of lined pipes. More specifically, the present invention concerns improvements to methods of joining sections of lined pipe with an electrofusion fitting that improves the ease with which joints can be formed therebetween, similar methods of repairing sections of lined pipe, and associated apparatus.

It is known that the life and performance of new and existing pipelines can be extended and optimised by lining lengths of metal pipe with polymer liners. For example, the Applicants Swagelining® pipe lining service allows existing pipelines to be remediated and new pipelines to be provided with corrosion resistance by installing a polymer liner that remains in tight contact with the inside of a host pipe.

To join adjacent lined pipe lengths, it is known to provide an electrofusion fitting to connect the inner pipe linings prior to welding the metal pipe lengths together. The Applicants earlier International Application Publication Number WO 2010/041016 discloses an electrofusion fitting and a method of forming a pipe joint between two lined metal pipe lengths incorporating such a fitting. The electrofusion fitting is a sleeve largely comprising a thermoplastic material and includes heating coils disposed at either end of the fitting. In use, the lining is stripped back and machined to provide a recess and the electrofusion fitting is inserted into the end of the metal pipe length where it is received in the recess. The heating coils are then provided with electrical power via electrical leads which extend through the electrofusion fitting and emerge at the inner surface of the fitting. This causes the fitting and the lining in the vicinity of the coils to melt and fuse together. The process is repeated to fuse the fitting to the lining of a subsequent (lined) metal pipe length, after which the metal pipe lengths themselves are welded together.

While the effect is such that a very effective weld is formed between the fitting and the pipe linings, there may be a perception that having electrical leads extending through the electrofusion fitting provides a possible leak path for pressurised fluid (such as may be transported by a lined pipe, for example in water injection applications).

Alternative methods of delivering electrical power to heating coils of an electrofusion fitting are known to include passing electrical leads through the gap between adjacent metal pipe lengths, however the use of open bevel weld preparation has restricted use in modern pipeline welding. Furthermore, external energisation processes of this kind are generally not suitable for closed bevel automatic pipeline welding processes which are common in subsea pipeline fabrication projects.

However, the Applicants earlier International Application Publication Number WO 2013/136082 discloses a solution to this problem which is particularly useful in very fast modern pipeline welding applications which make use of a closed bevel. The method involves drilling at least one hole through the closed bevel to allow access (through the hole) for a probe to supply electrical power to the heating coils via a contact or contacts disposed on an outer surface of the electrofusion fitting (and in electrical communication with the heating coils) that receives the probe. The probe can then be withdrawn and the hole or holes will be filled during the subsequent welding process.

Notwithstanding the above, it is an object of at least one aspect of the present invention to provide a further alternative method of joining sections of lined pipe using an electrofusion fitting that may provide increased confidence in the integrity of the pipe linings and/or the host pipes themselves. Embodiments of aspects of the present invention are intended to realise this object and to obviate or mitigate one or more further disadvantages of existing electrofusion fitting methods.

Further aims and objects of the invention will become apparent from reading the following description.

According to a first aspect of the invention, there is provided a method of creating a weld between a liner of a section of lined pipe and an electrofusion fitting comprising at least one heating element, the method comprising locating an end of the electrofusion fitting within an end of the section of lined pipe, locating an induction coil within a bore of the electrofusion fitting in the vicinity of the at least one heating element, and supplying electrical power to the induction coil to energise the heating element by electromagnetic induction.

Most preferably, supplying electrical power to the induction coil to energise the at least one heating element by electromagnetic induction causes heating of the at least one heating element.

Rather than requiring direct electrical connection to the heating element (or heating elements as the case may be) of an electrofusion fitting to energise and/or generate heat by direct application of electrical current, the present invention does away with the requirement for such direct electrical connection when joining sections of lined pipe (in which a liner is already fitted inside a host pipe) by taking advantage of the energisation and/or heating effect generated by electromagnetic induction.

Most preferably, supplying electrical power to the induction coil comprises passing alternating current through the induction coil. The frequency of the alternating current may be radio frequency. The frequency of the alternating current may, for example, be in the range of 5 to 400 kHz. Alternatively, supplying electrical power to the induction coil comprises ramping the current through the induction coil, for example using a sawtooth waveform.

Most preferably, the method comprises controlling, selecting or setting a frequency of the alternating current so as to cause heating of the at least one heating element without causing heating of the pipe. The depth to which the magnetic field induced by the current in the induction coil penetrates is controlled by the frequency of the alternating current. Alternatively, or additionally, the method may comprise selecting an electrofusion fitting having at least one heating element positioned at a location corresponding to the depth of penetration of the magnetic field induced by the current in the induction coil.

The method may induce eddy currents in the at least one heating element which results in heating thereof. Optionally, the method comprises inducing hysteresis losses in the at least one heating element which increases and/or enhances heating thereof.

Optionally, the method comprises supplying electrical power to the induction coil so as to heat at least a portion of the electrofusion fitting associated with the at least one heating element to a first temperature lower than a melting point of the material of the electrofusion fitting, and subsequently supplying electrical power to the induction coil so as to heat the at least a portion of the electrofusion fitting associated with the at least one heating element to a second temperature higher than the melting point of the material of the electrofusion fitting to weld the fitting to the pipe lining.

The at least a portion of the electrofusion fitting is advantageously proximal the pipe lining.

By virtue of the initial heating step or pre-heat, the fitting can expand to improve or ensure contact between the surface of the fitting and the pipe lining, and may compensate for misalignment between successive pipe linings and also overcome misalignment of the host (e.g. carbon steel) pipe that can be problematic in girth welding. The subsequent welding step can also be performed from a known starting temperature of the fitting and/or the pipe lining thus increasing reliability of the fusion process and the likelihood of making an acceptable weld. The initial heating step may also improve energy coupling into heating elements during the welding step.

Preferably, heating to the first temperature comprises supplying a first electrical current to the induction coil. Preferably, heating to the second temperature comprises supplying a second electrical current to the induction coil.

Optionally, the method comprises monitoring a temperature of at least a portion of the electrofusion fitting. Preferably, the method comprises controlling the supply of electrical current to the induction coil responsive to the temperature of the at least a portion of the electrofusion fitting to control the temperature.

Preferably, the method comprises locating the end of the electrofusion fitting in a recess in the end of the pipe lining. The recess is preferably formed in an inner surface of the pipe lining. Optionally, the method comprises machining the recess to receive the electrofusion fitting and/or machining the electrofusion fitting to fit the recess.

Alternatively, the electrofusion fitting may abut the end of the pipe lining.

Optionally, the method further comprises locating an opposite end of the electrofusion fitting within an end of a subsequent section of lined pipe, locating the induction coil or a further induction coil within the bore of the electrofusion fitting in the vicinity of at least one further heating element, and supplying electrical power to the induction coil or the further induction coil to cause heating of the at least one further heating element by electromagnetic induction.

The at least one heating element and the at least one further heating element may be associated with respective ends of the electrofusion fitting. The at least one further heating element may comprise one or more of the preferable or optional features of the at least one heating element described above and below. The induction coil may be sufficiently long to locate in the vicinity of both the at least one heating element and the at least one further heating element, or there may be provided a further induction coil associated with the at least one further heating element.

Optionally, the method comprises supplying electrical power to the induction coil, or to the induction coil and the further induction coil, so as to cause simultaneous heating of the at least one heating element and the at least one further heating element.

Optionally, the method comprises supplying electrical power to the induction coil or the further induction coil so as to heat at least a portion of the electrofusion fitting associated with the at least one further heating element to a first temperature lower than a melting point of the material of the electrofusion fitting, and subsequently supplying electrical power to the induction coil or the further induction coil so as to heat the at least a portion of the electrofusion fitting associated with the at least one further heating element to a second temperature higher than the melting point of the material of the electrofusion fitting to weld the fitting to the subsequent pipe lining.

Optionally, the method comprises simultaneously heating portions of the electrofusion fitting associated with the at least one heating element and at least one further heating element to the first temperature, and subsequently simultaneously heating the portions to the second temperature to weld the fitting to the liners of the sections of lined pipe.

According to a second aspect of the invention, there is provided an electrofusion fitting for joining liners of sections of lined pipe, the electrofusion fitting comprising at least one heating element disposed on or in an outer surface of the electrofusion fitting, the or each heating element being electrically isolated from an inner surface of the fitting and configured to heat at least an associated portion of the electrofusion fitting in response to electromagnetic induction.

Advantageously, by electrically isolating the or each heating element from an inner surface of the fitting, the potential for fluid leak paths between the or each heating element and the inner surface of the fitting can be minimised. It follows that energisation of the, or each, heating element is achieved using an energy source that is physically distinct from, and so not in direct electrical contact with, the or each heating element.

Stimulated by electromagnetic induction by an induction coil located in a bore thereof, the electrofusion fitting does away with the need for electrical contacts and/or leads. The at least one heating element may accordingly take any desirable shape or form as there is no longer any need to ensure a particular circuit is provided and followed by electrical current. Additionally, the at least one heating element can be provided without electrical contacts or leads.

Accordingly, the at least one heating element may comprise one or more coils, one or more bands or loops, one or more meshes or grids, may be continuous or discontinuous, and/or may for example comprise a plurality of particles embedded on or in the outer surface of the electrofusion fitting.

Preferably, the at least one heating element comprises a metal. Additionally, or alternatively, the at least one heating element comprises a ferromagnetic material.

Preferably, the at least one heating element is configured to produce one or more circumferential or annular welds between the electrofusion fitting and the pipe lining.

Preferably, the electrofusion fitting comprises at least one heating element disposed at a first end of the electrofusion fitting and at least one heating element disposed at a second end of the electrofusion fitting.

Optionally, the electrofusion fitting comprises induction coil locating means to locate one or more induction coils at a predetermined position within the electrofusion fitting. The induction coil locating means may comprise a shoulder. Alternatively, the induction coil locating means may comprise a recess. Optionally, the induction coil locating means is configured to locate an apparatus comprising the one or more induction coils so as to locate the induction coils at a predetermined position.

Preferably, the electrofusion fitting comprises a temperature sensor.

Preferably, the electrofusion fitting comprises a thermoplastic material. Most preferably, the electrofusion fitting comprises a sleeve of thermoplastic material.

The electrofusion fitting may comprise a generally tubular sleeve. In such embodiments, the or each heating element is disposed on or in a radially outer surface of the fitting, and is electrically isolated from a radially inner surface of the fitting.

Preferably, the electrofusion fitting is configured for insertion into the end of a lined pipe section. Preferably, the electrofusion fitting is configured to be received in a recess in the end of the pipe lining. Preferably, the electrofusion fitting is configured to be received in a recess formed in an inner surface of the pipe lining.

Alternatively, the electrofusion fitting may be configured to abut the end of the pipe lining.

Optionally, the electrofusion fitting is formed by an injection moulding process.

Embodiments of the second aspect of the invention may comprise one or more features corresponding to one or more preferred or optional features of any other aspect of the invention, or vice versa.

According to a third aspect of the invention, there is provided an apparatus for energising at least one heating element of an electrofusion fitting, the apparatus comprising a body configured to be received in a bore of the electrofusion fitting, and at least one induction coil disposed on or in the body at a location corresponding to the position of the at least one heating element. In other words, the or each induction coil is located at a particular position on the body so as to be able to energise, and therefore effect heating of, the heating element(s) of an electrofusion fitting in which the apparatus is received in use. The apparatus is configured for insertion into the electrofusion fitting using a reach rod (or equivalent).

The apparatus may comprise the reach rod (or equivalent). The apparatus may comprise a pig. Alternatively, or in addition, the apparatus may comprise a sleeve or a mandrel.

The apparatus may be provided with a battery to supply electrical power to the at least one induction coil. Alternatively, or additionally, the apparatus may be connectable or connected to an external power source.

The apparatus may be configured to cooperate with one or more locating means provided in the electrofusion fitting. For example, the apparatus may be configured to abut a shoulder. Alternatively, or additionally, the apparatus may be configured to be at least partially received in a recess. Optionally, the at least one induction coil may be urged into the recess, for example by expansion, inflation or biasing of the at least one induction coil or associated part of the apparatus.

Embodiments of the third aspect of the invention may comprise one or more features corresponding to one or more preferred or optional features of any other aspect of the invention or vice versa.

According to a fourth aspect of the invention there is provided a method of laying a pipeline, the method comprising creating at least one weld between a liner of a section of lined pipe and an electrofusion fitting in accordance with the first aspect.

Preferably, the method further comprises creating at least one further weld between a liner of a further section of lined pipe and an opposite end of the electrofusion fitting in accordance with the first aspect.

Embodiments of the fourth aspect of the invention may comprise one or more features corresponding to one or more preferred or optional features of any other aspect of the invention or vice versa.

According to a fifth aspect of the invention, there is provided a pipeline comprising at least one section of lined pipe comprising a liner welded to an electrofusion fitting according to the second aspect.

According to a sixth aspect of the invention, there is provided a method of repairing a lined pipe, the method comprising removing a section of the lined pipe, inserting ends of a sleeve comprising a heating element in corresponding ends of the lined pipe, locating an induction coil within a bore of the sleeve in the vicinity of the heating element, and supplying electrical power to the induction coil to energise the heating element by electromagnetic induction.

Most preferably, energising the heating element causes heating of the heating element.

The sleeve may comprise at least one heating element at both ends of the sleeve to heat corresponding ends of the sleeve, or the sleeve may comprise a single heating element extending substantially the length of the sleeve to heat both ends of the sleeve. The induction coil preferably heats the at least one heating element at both ends of the sleeve, or the single heating element, to heat both ends of the sleeve simultaneously.

According to a seventh aspect of the invention, there is provided a sleeve for repairing a lined pipe, the sleeve comprising one or more heating elements disposed on or in a surface of the sleeve, the or each heating element being electrically isolated from an inner surface of the fitting and configured to heat at least associated portions of the sleeve in response to electromagnetic induction.

The sleeve preferably comprises at least one heating element at both ends of the sleeve. Alternatively, the sleeve may comprise a single heating element extending substantially the length of the sleeve.

Embodiments of the fifth to seventh aspects of the invention may comprise one or more features corresponding to one or more preferred or optional features of any other aspect of the invention or vice versa. In particular, the sleeve of the seventh aspect may comprise one or more features corresponding to one or more preferred or optional features of the first aspect.

Other aspects of the invention provide an electrofusion fitting, a pipe lining, induction coil apparatus, a method of creating a weld between an electrofusion fitting and a pipe lining, a sleeve for repairing a lined pipe, or a method of repairing a section of lined pipe, substantially as herein described with reference to the appended drawings.

Aspects and advantages of the present invention will become apparent upon reading the following detailed description and upon reference to the following drawings (like reference numerals referring to like features), in which.

Figure 1:
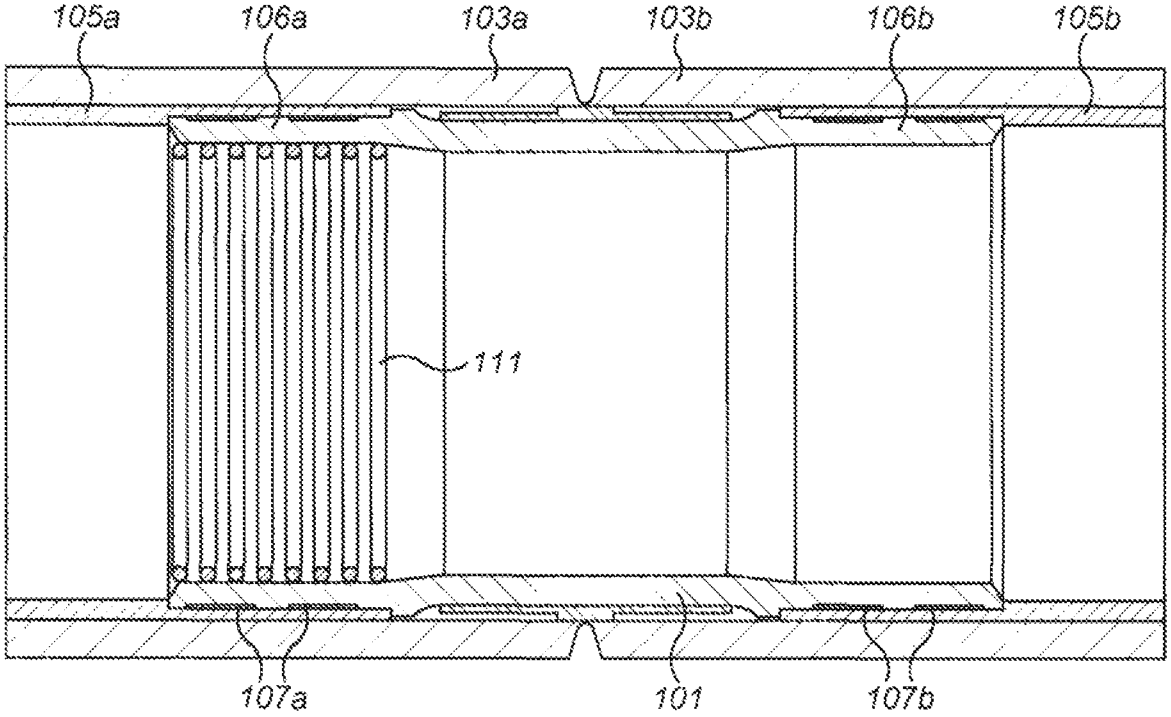
FIG. 1 is a schematic sectional view of an electrofusion fitting located within respective pipe linings of two lengths of lined pipe which are to be welded together, in accordance with an embodiment of the invention.

As discussed in the background to the invention above, solutions exist which enable sections of lined pipe to be joined using electrofusion fittings to preserve continuity of the pipe lining along the length of a pipeline, while avoiding compromising the welds between individual lengths of host pipe. However, there may be a perception that such solutions complicate or compromise the methods and/or the apparatus involved and as such there is always a desire to provide alternative solutions which may or may not address such perceived complications or compromises. Note that the terms liner, lining and pipe lining may be used interchangeably and each refer to a pipe lining within a host pipe.

An embodiment of the present invention is described below, with reference to FIG. 1, which provides such an alternative solution.

An electrofusion fitting 101 is formed by a tubular sleeve of a thermoplastic material having heating coils 107*a*, 107*b* disposed toward either end of the fitting 101. The electrofusion fitting 101 is shaped and sized to be inserted into the end of a lined pipe section 103*a*/103*b* and received in a recess 106*a*/106*b* in the end of the pipe lining 105*a*/105*b*. The heating coils 107*a*/107*b* (which in this example comprise copper wire) are embedded in the outer surface of the fitting 101, so as to be adjacent to and facing an inner surface of the pipe lining 105*a*/105*b*, such that if provided with sufficient electrical power the thermoplastic material of the fitting 101 and of the lining 105*a*/105*b* in the vicinity of the coils would melt and fuse together, thus creating circumferential or annular welds between the fitting 101 and the pipe lining 105*a*/105*b*.

However, in contrast to known electrofusion fittings for joining lengths of lined pipe, for example as described above with reference to WO 2010/041016 and WO 2013/136062, the heating coils 107*a*/107*b* are not provided with electrical leads by which electrical power would be supplied thereto, and so are electrically isolated from the radially inner surface of the electrofusion fitting 101. This minimises the potential for the formation of fluid leakage paths at the joint between the electrofusion fitting 101 and a pipe lining 105*a*/105*b*.

In this context, the present invention takes an alternative approach to energising the heating coils 107*a*/107*b* to that of the prior art. This approach involves locating an induction coil 111 within the longitudinal bore extending through the electrofusion fitting 101 in the vicinity of heating coils 107*a*/107*b* (in FIG. 1 the induction coil 111 is located in the vicinity of heating coils 107*a*), and supplying an alternating current to the induction coil 111, which results in generation of an alternating electromagnetic field which can penetrate the heating coils 107*a*/107*b*. This can result in the generation of eddy currents within the heating coils 107*a*/107*b*, which in turn results in the temperature of the heating coils 107*a*/107*b* increasing.

Accordingly, the thermoplastic material of the fitting 101 and of the lining 105*a*/105*b* in the vicinity of the coils 107*a*/107*b* can be made to melt and fuse together, thus creating circumferential or annular welds between the fitting 101 and the pipe lining 105*a*/105*b*, without the need to make physical or electrical contact with the coils 107*a*/107*b*.

The induction coil (or induction coils as the case may be) can, for example, be inserted into the bore of the electrofusion fitting using a reach rod or equivalent apparatus. An induction coil apparatus could therefore comprise at least the induction coil(s) and a reach rod or equivalent. Such apparatus may be provided with a battery to power the induction coil(s) and/or be connectable to or connected to an external power supply.

Alternatively, in an induction coil apparatus the induction coil (or induction coils) may be provided on or in a pipeline pig, a sleeve, mandrel, or an equivalent body which is configured (e.g. sized and shaped) to be received in an electrofusion fitting. Again, the pipeline pig, sleeve, mandrel or equivalent body may be provided with a battery and/or be connectable to or connected to an external power supply.

By adjusting the frequency of the alternating current delivered to the induction coil 111, the depth of penetration of the resulting electromagnetic field can be controlled.

Higher frequency current tends to produce a thin heating effect i.e. penetration to a low depth whilst a lower frequency current produces a deeper heating effect i.e. penetration to higher depths. Appropriate selection of the operating frequency can therefore ensure that the electrofusion coils (or elements, see below) are energised without heating the host pipe.

It will be clear that although the embodiment described above omits electrical leads which extend through the electrofusion fitting to an inner surface thereof, which extend sufficiently to pass through the gap between adjacent host pipe ends, or which extend to a contact or contacts via which electrical power may be provided, it will be understood that the method described above would still result in heating of the coils. In other words, the new and inventive method of energising the heating coils can be used with known electrofusion fittings (although some of the advantageous effects discussed below may be reduced or lost).

It will also be clear that it is not a prerequisite that the electrofusion fitting be received in a recess in a pipe lining; the electrofusion fitting could simply be of an outer diameter commensurate with an inner diameter of the pipe lining. Alternatively, the electrofusion fitting could be of dimensions commensurate with the pipe lining and heating coils disposed on end faces of the electrofusion fitting so as to produce a weld between an end face of the electrofusion fitting and a corresponding end face of the pipe lining.

While it is desirable that the longitudinal bore extending through the electrofusion fitting has a smooth or continuous internal profile so as to avoid turbulence or other undesirable effects, the electrofusion fitting may be provided with an internal shoulder or other means for positively locating the induction coil (or induction coils) in the correct position for energisation of the heating elements. For example, a shoulder may prevent further travel through the bore of the electrofusion fitting when the induction coil (or induction coils) is inserted using a reach rod as suggested above. Alternatively, there may be provided a recess (or recesses) shaped to receive and preferentially locate the induction coil (or induction coils) for energisation of the heating elements. It is foreseen that the induction coil(s) or part(s) of the apparatus could be expanded, inflated or otherwise biased so as to urge the induction coil(s) into such recess(es) when in the correct position.

Any of these arrangements may apply whether the induction coil(s) are inserted using a reach rod and/or equivalent arrangements, and/or whether the induction coil(s) are disposed on or in a pig, sleeve, mandrel or other equivalent body, and regardless of how the induction coils are powered.

It can be advantageous if the heating coils 107*a*, 107*b* (or other heating elements as explored below) at either end of the electrofusion fitting 101 are heated simultaneously so as to weld the electrofusion fitting 101 to both liners 105*a*, 105*b* simultaneously. This can be achieved for example by using a corresponding pair (or corresponding number) of induction coils, or a single induction coil of sufficient length to interact with both (or all) heating coils 107*a*, 107*b* simultaneously.

FIG. 1 illustrates an electrofusion fitting which has a pair of heating coils 107*a*/107*b* at either end. An electrofusion fitting according to the invention can clearly be provided with a single coil at either end, or indeed several individual coils, without deviating from the inventive concept.

Figure 2:
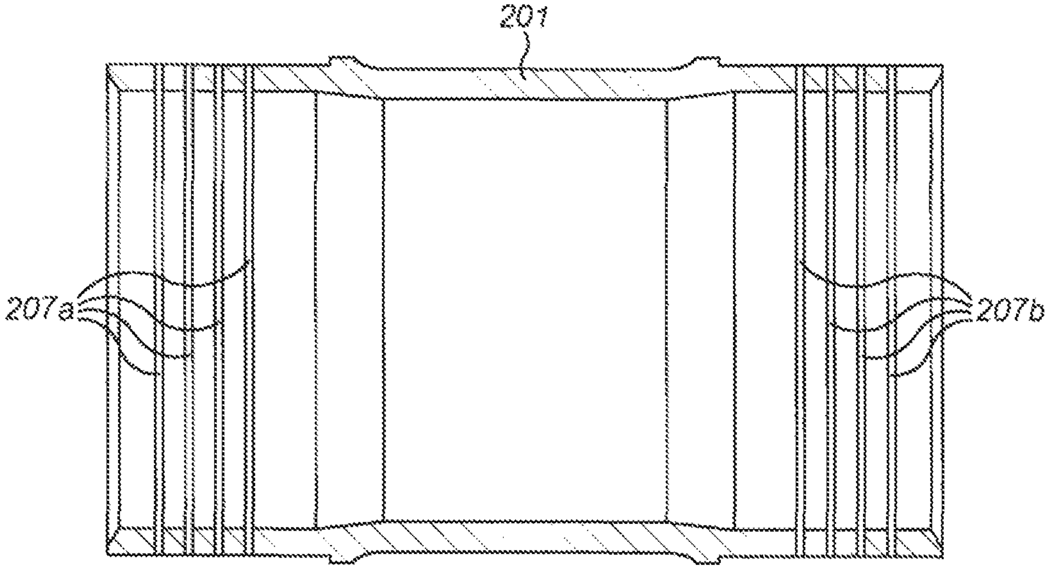
FIG. 2 is a schematic sectional view of an electrofusion fitting, in accordance with an embodiment of the invention, comprising an alternative heating element.

It is also foreseen that the heating coils can be replaced with any suitable element which is capable of conducting electricity and is thereby susceptible to induction heating. FIG. 2 shows an embodiment in which, instead of heating coils, the electrofusion fitting 201 is provided with a series of circumferential bands 207a/207b in respective surfaces of the electrofusion fitting 201.

Note that while the heating mechanism described above relies on the generation of eddy currents, an additional heating mechanism may be provided if the heating element comprises a ferrous material such as iron. This is caused by magnetic hysteresis losses resulting from the alternating magnetic field generated in the heating element by the induction coil. Accordingly, it may be advantageous though not critical if the heating elements are ferromagnetic or comprise a ferromagnetic material.

Figure 3:
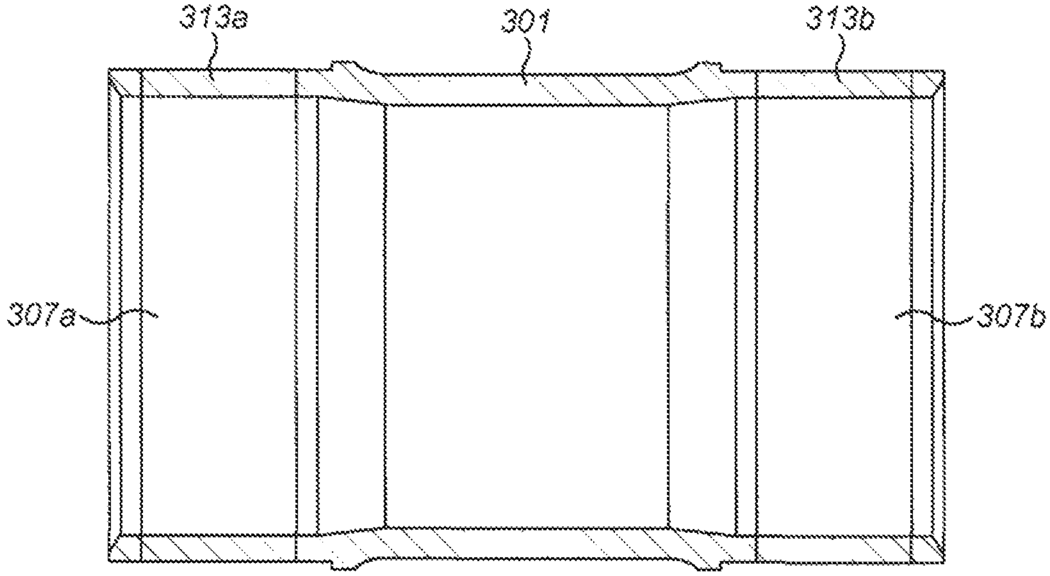
FIG. 3 is a schematic sectional view of an electrofusion fitting, in accordance with an embodiment of the invention, comprising another alternative heating element.

It would also be possible to effectively provide heating elements by doping respective surfaces of the electrofusion fitting with metallic or ferromagnetic particles. FIG. 3 shows such an embodiment in which surfaces of the electrofusion fitting 301 have been doped with copper particles 313a/313b. This effectively forms a thick circumferential heating band 307a/307b at either end of the electrofusion fitting 301.

Figure 4:
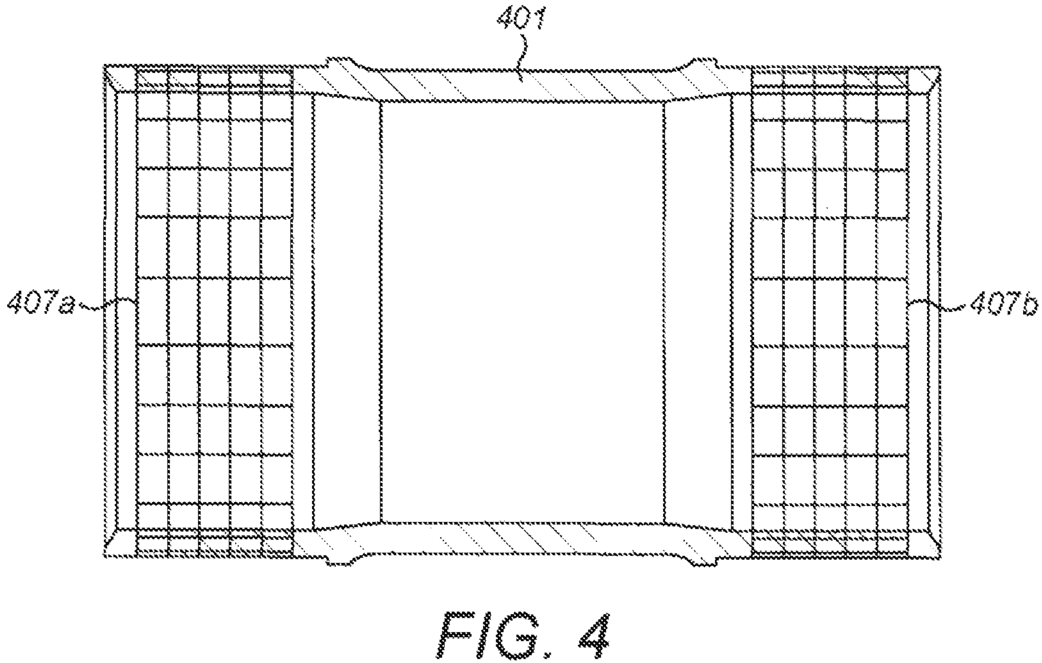
FIG. 4 is a schematic sectional view of an electrofusion fitting, in accordance with an embodiment of the invention, comprising a further alternative heating element.

It is also foreseen that a wire mesh 407a/407b could be applied on or within the surfaces such as illustrated in the electrofusion fitting 401 in FIG. 4.

An electrofusion fitting which employs one or more of these approaches to providing heating elements may negate the need for a coil and thereby avoid the risk of fluid tracking around such a coil in the event of a leak as the weld can be made to be continuous both in a longitudinal as well as circumferential sense.

The main benefit of the present invention is the removal of the risk (perceived or otherwise) of fluid ingress through an internally located electrical contact point. This may significantly improve the reliability of electrofusion fittings and corresponding welds or joints made according to the present invention.

The invention also eliminates the need to make a physical connection with the electrofusion fitting, which eliminates the potential for contacts to be damaged during a connection and/or disconnection process. It also eliminates the need to locate, with precision, with the contacts in the provision of electrical power.

As a result, manufacture of electrofusion fittings will become less complex and therefore lower cost as there will be no requirement route electrical leads through the electrofusion fitting to an inner surface where high pressure fluids are or will be present, or provide other electrical contact points for example to receive a probe inserted between host pipe ends.

The testing requirements for such electrofusion fittings would also be significantly reduced because there will be no need to test an electrical contact point inside the flowline to prove it is leak free.

Furthermore, because the electromagnetic field can energise the heating elements (be they comprised of coils, bands, doped regions and/or mesh) in a uniform manner, the heating of the elements should be consistent across and around the respective regions of the electrofusion fitting. This should reduce the potential for lower welding temperatures that can otherwise occur at the extremities of heating elements powered using conventional means.

Existing methods in which heating coils are energised using electrical current need to account for changes in the electrical resistance of the electrofusion circuits as they heat up. This should be avoided using the approaches described herein.

As noted above, by adjusting the frequency of the current to the induction coil, the depth of penetration can be controlled. High frequency current tends to produce a thin heating effect i.e. penetration to a low depth whilst a lower frequency current produces a deeper heating effect. This could enable the electrofusion fitting to be thinner in cross section thereby reducing material and/or manufacturing cost. It is foreseen that an electrofusion fitting could be designed based on a desired induction coil configuration: for example if a desired induction coil configuration was known to penetrate to a particular depth then heating coils or other heating elements could be located in the electrofusion fitting at that depth.

Note that instead of application of an alternating current, it is foreseen that DC current could be provided; although in this case it would be necessary to ramp the current to generate heat in the electrofusion heating element(s). Application of an alternating current is however preferred as it is expected to improve tolerance to any imperfections which might be present in the heating elements.

Note that it may be advantageous if, prior to the electrofusion process being carried out, the heating coils (or other elements as the case may be) are energised so as to heat the electrofusion fitting to a first temperature, which is lower than a melting point of the material of the electrofusion fitting. This can improve fit up between the electrofusion fitting and the respective pipe linings and may compensate for misalignment therebetween. Furthermore, preheating the electrofusion fitting also provides a predetermined starting temperature for the fitting and the lining(s) which results in improved fusion cycle reliability. Furthermore, the need for clamps or support frames to support the electrofusion fitting in situ may be removed, with further corresponding reductions in cycle times, complexity, and hence cost. Analogous approaches are described in the Applicants earlier International Application Publication Number WO2015/008028. As noted above, it can be advantageous if the heating elements at both ends are energised simultaneously so as to first preheat both ends of the electrofusion fitting simultaneously and then perform the weld step at both ends simultaneously.

An alternative application of the inventive concept is to effect a repair to an electrofusion fitting. For example, in the event electrofusion welds have been made successfully but the weld between the host pipes (e.g. a carbon steel girth weld) is not acceptable, it may be necessary to cut out said weld. Based on current approaches, the whole section of pipe containing the electrofusion fitting would need to be removed, requiring the pipe and lining to be prepared again and the whole process repeated.

Alternatively, the girth weld may simply be cut out taking the same width of material from the electrofusion fitting directly under the section of the weld/pipe that has been removed. Using a short cylindrical section or sleeve of polymer provided with one or more electrofusion coils (or other elements) on the outer surface as a patch, the ends of the host pipes and the remaining parts of the electrofusion fitting (from the cut out) can be brought together and the patch inserted under the ends after (or while) they are aligned. The ends may or may not be prepared by partially machining the surfaces to receive the patch. After the patch is in location, an induction coil can be inserted within the bore of the patch and energised such that the patch is fused to both sides of the electrofusion fitting thus restoring its capability to prevent fluid ingress. The patch would be leak tested as per normal electrofusion fitting procedures to verify integrity.

The patch may comprise induction coil locating means such as or similar to those described above in relation to electrofusion fittings, and likewise the induction coil (or coils) can be provided on or in an induction coil apparatus such as or similar to those described above.

The invention provides improvements to electrofusion fitting methods that improve the ease with which welds between an electrofusion fitting and pipe linings can be produced. In particular, the invention uses electromagnetic induction generated by one or more induction coils to cause heating of one or more heating elements of an electrofusion fitting. An induction coil arrangement such as described herein does away with the requirement for direct electrical connection to heating elements when joining liners thus simplifying the process by which the lined pipes which house the liners themselves are joined.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A pipeline comprising at least one section of lined pipe comprising a liner within a metal host pipe, the liner being welded to an electrofusion fitting, the electrofusion fitting comprising at least one heating element disposed on or in an outer surface of the electrofusion fitting, the or each heating element being electrically isolated from an inner surface of the fitting and configured to heat an associated portion of the electrofusion fitting in response to electromagnetic induction, wherein the at least one heating element is provided without electrical leads.

2. The pipeline of claim 1, comprising an induction coil locator to locate at least one induction coil at a predetermined position within the electrofusion fitting.

3. The pipeline of claim 2, wherein the induction coil locator comprises a shoulder.

4. The pipeline of claim 2, wherein the induction coil locator comprises a recess.

5. The pipeline of claim 2, wherein the induction coil locator is configured to locate an apparatus comprising the at least one induction coil at a predetermined position.

6. The pipeline of claim 1, configured for insertion into the end of a lined pipe section.

7. The pipeline of claim 6, configured to be received in a recess in the end of the pipe lining.

8. The pipeline of claim 6, configured to be received in a recess formed in an inner surface of the pipe lining.

9. The pipeline of claim 1, wherein the at least one heating element comprises one or more coils.

10. The pipeline of claim 1, wherein the at least one heating element comprises one or more bands or loops.

11. The pipeline of claim 1, wherein the at least one heating element comprises one or more meshes or grids.

12. The pipeline of claim 1, wherein the at least one heating element is continuous.

13. The pipeline of claim 1, wherein the at least one heating element is discontinuous.

14. The pipeline of claim 1, wherein the at least one heating element comprises a plurality of particles embedded on or in the outer surface of the electrofusion fitting.

15. The pipeline of claim 1, wherein the at least one heating element comprises a metal.

16. The pipeline of claim 1, wherein the at least one heating element comprise a ferromagnetic material.

17. The pipeline of claim 1, wherein the at least one heating element is configured to produce one or more circumferential or annular welds between the electrofusion fitting and the pipe lining.

18. The pipeline of claim 1, comprising at least one heating element disposed at a first end of the electrofusion fitting and at least one heating element disposed at a second end of the electrofusion fitting.

19. The pipeline of claim 1, comprising a temperature sensor.

20. The pipeline of claim 1, comprising a tubular sleeve.

21. The pipeline of claim 1, comprising a sleeve of thermoplastic material.

22. The pipeline of claim 1, configured to abut the end of the pipe lining.

23. The pipeline of claim 1, formed by an injection moulding process.

24. A pipeline comprising at least one section of lined pipe comprising a liner within a metal host pipe, the liner being welded to a sleeve for repairing the lined pipe, the sleeve comprising one or more heating elements disposed on or in an outer surface of the sleeve, the or each heating element being electrically isolated from an inner surface of the sleeve and configured to heat associated portions of the sleeve in response to electromagnetic induction, wherein the or each heating element is provided without electrical leads.

25. The pipeline of claim 24, comprising at least one heating element at both ends of the sleeve.

26. The pipeline of claim 24, comprising a single heating element extending substantially the length of the sleeve.

27. The pipeline of claim 24, wherein the sleeve is welded to an electrofusion fitting.

* * * * *